United States Patent [19]

MaCleod

[11] Patent Number: 5,200,928
[45] Date of Patent: Apr. 6, 1993

[54] METHOD FOR USING MODE CONVERTED P- TO S- WAVE DATA TO DELINEATE AN ANOMALOUS GEOLOGIC STRUCTURE

[75] Inventor: Mark K. MaCleod, Houston, Tex.

[73] Assignee: Chevron Research and Technology Company, San Francisco, Calif.

[21] Appl. No.: 789,229

[22] Filed: Nov. 7, 1991

[51] Int. Cl.[5] .............................................. G01V 1/00
[52] U.S. Cl. ........................................ 367/27; 367/57; 367/75; 367/73; 181/112; 364/422
[58] Field of Search .................. 181/102, 112; 364/421, 364/422; 367/25, 27, 33, 40, 53, 72, 73, 75, 57

[56] References Cited

U.S. PATENT DOCUMENTS

| | | | |
|---|---|---|---|
| 4,835,745 | 5/1989 | Young et al. | 367/56 |
| 4,881,207 | 11/1989 | Dubesset et al. | 367/72 X |
| 4,953,142 | 8/1990 | Rimmer | 367/73 |
| 4,972,384 | 11/1990 | William | 367/75 |
| 5,067,113 | 11/1991 | Hanson et al. | 367/73 X |

OTHER PUBLICATIONS

Waters, K. H.; "Reflection Seismology", 2nd Ed. John Wiley & Sons, 1981, p. 200.

*Primary Examiner*—Brian S. Steinberger
*Attorney, Agent, or Firm*—W. K. Turner; Matt W. Carson

[57] ABSTRACT

A method for using mode converted P- or S- wave data to delineate the surface of an anomalous geologic structure such as a salt dome is disclosed. Seismic wavefields are propagated from near the surface, through the earth, and through the anomalous geologic unit, so that a wavefield encounters the geologic unit at a non-normal incidence angle to generate a converted S- wave. Incidence angles of the direct arrival and converted waves are then determined. The intersection point of each converted S- wave raypath with each direct arrival raypath is determined, to provide a length of the raypaths. Travel times along the raypaths are determined, and a point on the interface of the anomalous geologic unit with the surrounding earth is determined by comparing raypath travel time differences with the recorded arrival time differences.

3 Claims, 5 Drawing Sheets

FIG_1

FIG_2

FIG_4

FIG_5

FIG_6

METHOD FOR USING MODE CONVERTED P- TO S- WAVE DATA TO DELINEATE AN ANOMALOUS GEOLOGIC STRUCTURE

RELATED APPLICATION

This application is related to Applicant's co-pending application Ser. No. 07/771,298 entitled "METHOD FOR DELINEATING AN ANOMALOUS GEOLOGIC STRUCTURE", filed Oct. 4, 1991, which has been assigned to Applicant's assignee, and which is hereby incorporated by reference.

FIELD OF THE INVENTION

The present invention relates generally to geophysical exploration for oil and gas. More specifically, this invention provides a method of using seismic sensors having a known orientation and mode converted P- to S- wave data to delineate the surface of a geologic unit having an anomalous velocity. It is particularly useful to delineate the surface of a subterranean salt mass.

BACKGROUND OF THE INVENTION

An appreciable portion of the oil production in the United States is from reservoirs associated with piercement salt domes in the Gulf of Mexico region and in the Paradox Basin. The general location of the salt dome is known from surface exploration, but the locations of its flanks, especially at certain depths where possible pay sands may be truncated by the salt, are not known with an accuracy that would be sufficient for oil field development.

The geometry of the salt flank and overhang associated with quite a few of these salt domes is not precisely known. With the refocusing of the U.S. oil industry in the direction of development drilling and a de-emphasis on exploration, there has been a resurgence in interest to define these producing salt dome geometries more exactly. This will ultimately allow a better quantification of any unrealized updip hydrocarbon potential associated with these producing fields.

In specific areas however, such as the East Texas Basin, the salt dome flanks are relatively unexplored. Seismic surveys refracting energy through the salt and then recording the wavefield in an adjacent well (known as salt proximity surveys), are of limited use in this area. The high sedimentary rock velocities encountered relatively shallow in the stratigraphic section preclude the success of the downhole refraction technique to aid in defining the salt flank geometry.

Since the 1930's, two types of borehole seismic surveys have been used to define the shape of salt domes—radial refraction surveys and proximity surveys (McCollum and LaRue, "Utilization of Existing Wells in Seismograph Work," Amer. Assn. of Petroleum Geologists Bull. 5, No. 12, pp. 1409-1417, 1931). In the radial refraction survey, (such as the surveys disclosed by L. W. Gardner in "Seismograph Determination of Salt-dome Boundary Using Well Detector Deep on Dome Flank," *Geophysics*, v. 14, pp. 29-38, 1949), a downhole three component (3C) phone is placed inside a salt dome usually at a depth greater than the objective depth. Typically, an exploration well that drilled on the flank of the dome and bottomed in or near salt is used as the receiver well. Shots are fired in a pattern resembling spokes radiating from the opposite flank of the dome. Since these surveys were carried out before the development of downhole gyroscopes, the geophone orientation was not known. Only travel time is provided as output, and the interpreter has to estimate the sediment velocities, to generate a 3-dimensional surface of possible solutions. Several seismic shots are needed so that these 3-D surfaces can be lined up. Using the direct arrival time and salt and sediment velocities, the surface of all solutions that fit the observed time is displayed in either vertical or horizontal slices. The tangent to these "aplanatic" surfaces provides the estimate of the salt-sediment interface.

However, conducting a radial refraction survey with wireline tools has severe drawbacks. The cost is excessive. A 20-level radial refraction survey with over 200 source points recorded into a single geophone, with offsets up to 20,000 feet and a wide azimuth range would not be economically feasible with prior art procedures. Shots would have to be repeated at each level, so 200 source points with 20 levels would require 4000 shots.

Proximity surveys are designed to image the salt flank very near the wellbore. In this method, a source is placed over the top of a dome with a downhole 3C geophone in sediments on the flank of the dome. Since the 1980's, these surveys have been recorded with a gyroscopically oriented 3C phone which reduces the range of possible solutions for the salt-sediment interface from an ambiguous 3D aplanat to a unique point in space. The use of gyroscopes to determine the orientation of geophones in a wellbore is disclosed in U.S. Pat. No. 4,800,981 issued to Uttecht et al. and by A. Manzur in "Delineation of Salt Masses Using Borehole Seismics" in the *Oil and Gas Journal*, Oct. 7, 1985.

A proximity survey only provides useful information pertaining to the location of a salt flank that is within a few hundred feet from the wellbore. Therefore, only a very narrow vertical slice of information along the well path is obtained.

The use of compressional, or P wave reflection data in geophysics analysis is well known. A typical seismic reflection prospecting system which produces compressional wave reflection data would be comprised of a compressional wave source located on the surface and geophones spaced along a line of exploration on the surface for measuring the vertical component of the ground motion caused by the reflected compressional wave. However, conventional P- waves travelling through the subsurface also produce vertically-polarized shear, or converted S- waves when reflected at other than a normal angle of incidence. Thus, seismic sections produced by such compressional wave seismic exploration systems would contain two types of wave information which, if properly exploited, will yield useful information regarding the lithologic characteristics of the subsurface formation under investigation. In recent years, interest has been growing in obtaining shear wave information to provide useful information regarding the lithological characteristics of the subsurface formation under investigation. Such information, if properly obtained and exploited, can be utilized in conjunction with information obtained from compressional wave seismic section to provide a more detailed analysis of the characteristics of the subsurface formation. For example, compressional wave seismic sections can provide useful information on the compressibility of subsurface formations, while shear wave seismic sections can provide useful information on subsurface formation rigidity.

Several limitations related to the characteristics of the shear wave have, however, prevented the full exploitation of shear wave information. Shear wave seismic reflections are noisier than compressional wave seismic reflections, making proper interpretation difficult. Furthermore, the direct propagation of a shear wave into a subsurface formation to induce a shear wave reflection requires special transducers and additional steps over and above those required for obtaining compressional wave reflection data. This makes obtaining shear wave reflection data difficult, more costly and time-consuming.

Three U.S. patents have issued to C. W. Frasier and have been assigned to Applicant's assignee. U.S. Pat. No. 4,611,311 discloses a method of collecting and stacking converted wave reflections to reinforce the reflections at the proper subsurface location (at common reflection points), using recording methods known in the art.

U.S. Pat. Nos. 4,597,066 and 4,596,005, also issued to C. W. Frasier, illustrates that for dipping geologic layers, the conventional (P-P) reflections also must be collected and stacked using a common reflection point method, as the dip angles cause the reflection paths to be non-symmetric.

U.S. Pat. No. 4,881,209, issued to Bloomquist et al., teaches a method of correcting converted P- to S- wave data for normal moveout, from standard reflection events. P- to S- wave velocity ratios are selected and collections of traces corresponding to a selected ratio are stacked and the series of stacks are correlated to the originally collected stacked data to determine the correct Vp/Vs ratio and shear wave velocity.

The patents issued to Frasier and Bloomquist all are concerned with reflection data in a medium having nearly constant velocity. As P- wave velocity is known and S- wave velocity is not known, certain approximations must be made.

There is therefore a need for a method of migrating transmitted seismic data that penetrates a geologic unit having an anomalous velocity that is independent of the velocities of the surrounding sediments.

The prior work is limited in the attempts at delineating the flanks of a salt mass in that no suitable method can economically and accurately delineate the salt mass flanks over large portions of the salt mass. A 3D surface seismic survey would provide adequate results, but would cost at least ten times as much. There is, therefore, a need for such a method for use in the geophysical exploration for oil and gas.

SUMMARY OF THE INVENTION

The present invention is surprisingly successful in providing a method for delineating the surface of a geologic unit that has an anomalous velocity such as a salt dome. Direct arrival (P- wave) and later mode converted P- to S- wave data are recorded by geophones that have known orientations. It is especially useful in geophysical exploration for oil and gas around the flanks of a salt dome. The method economically and accurately delineates the salt flanks over the entire salt mass.

In one aspect of the invention, at least two seismic sensors having three axes of sensitivity are attached to the outside of a tubing means which has top and bottom ends. The tubing means is lowered into a wellbore which penetrates the geologic unit of interest.

The orientations of each of the axes of each of the sensors are calculated. At least one seismic wavefield is emanated from at least one seismic source point, wherein the wavefields are propagated through the surrounding earth and through the geologic unit of interest so that a wavefield encounters the geologic unit at a non-normal incidence angle to generate a converted S- wave which is observed at the sensor's axes of sensitivity and is separately recorded. The incidence angle $\phi_p$ of the direct arrival wave is determined, and the incidence angle, $\phi_s$, of the converted S- wave is then determined, where:

$$\phi_s = \sin^{-1}(dt/dz) * V_s$$

The intersection point of each converted S- wave raypath with the raypath of each direct arrival is determined, to provide a length of the raypaths.

Then, the travel times along the converted S- wave raypath and along the direct arrival raypaths are determined by dividing the raypath length by its respective velocity. A point on the interface of the geologic unit with the surrounding earth is determined by comparing the difference between the above referenced raypath travel times with the difference between the recorded arrival times of the converted S- wave and the direct arrival wave. Snell's Law may then be applied to determine the dip of the geologic unit at the interface.

The interface of the geologic unit with the surrounding earth at a point along the converted S- wave raypath can be determined in three dimensions if the direct arrival raypath is in the source-receiver plane.

The above and other embodiments, objects, advantages, and features of the invention will become more readily apparent from the following detailed description of the invention, which is provided in connection with the accompanying drawings.

DETAILED DESCRIPTION OF THE INVENTION

In accordance with the present invention, a new improved method for using mode converted P- to S- wave data recorded by oriented seismic sensors to delineate the surface of a geologic unit having an anomalous velocity has been developed.

The present invention utilizes a field layout that is similar to a radial refraction survey. Data analysis, however, is like the data analysis in a proximity survey. At least two three component (3C) geophones are permanently emplaced, at a known orientation inside a wellbore that penetrates a salt dome, at a depth roughly equal to the depth of hydrocarbon exploration interest (the objective depth). It is preferable to use a string of oriented geophones.

Figure 1:
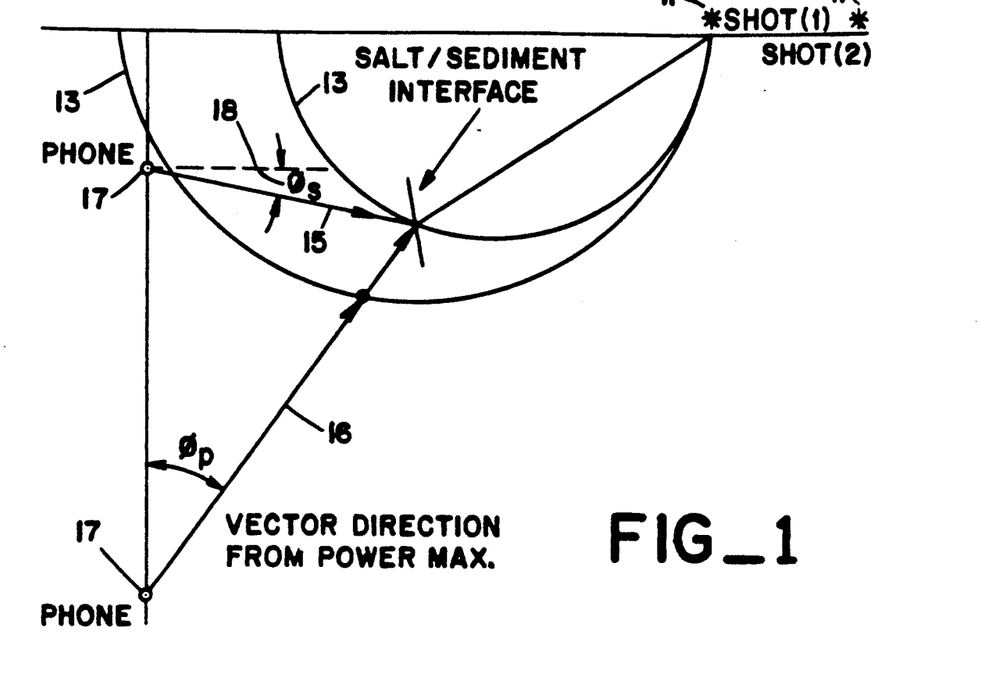
FIG. 1 is a schematic drawing that shows a ray trace migration technique for the direct arrival wave, to map a salt-sediment interface.

Referring to the drawings, FIG. 1 shows a schematic cross-sectional view of the earth and a well that has penetrated a geologic unit having an anomalous velocity, such as a salt mass as shown here. One or more seismic wavefields are caused to emanate from at least one seismic source points 11, wherein the seismic wavefields 13 are propagated first through the surrounding earth, and then through the geologic unit having the anomalous velocity. In the inventive method, the seismic wavefields 13 are propagated first through the surrounding earth, and then through the geologic unit having an anomalous velocity so that a wavefield 13 encounters the geologic unit at a non-normal incidence angle to generate a converted S- wave (P-S) 15, which is observed at the orthogonal axes of sensitivity at the sensors 17. The transmitted P- wave 16 (P-P) is also observed at a sensor 17.

If the direct arrival hits the anomalous geologic unit (salt) at a non-normal incidence angle it will generate a transmitted shear wave in addition to a refracted P- wave (P-P). Since the P- and S- wave salt velocities are well known (or they could be measured with a zero offset P- and S- wave VSP), the time difference between the direct arrival and the shear wave generated by the direct arrival can be used to estimate the position of the salt-sediment interface. The observed wavefields are separately recorded along each orthogonal axis of each sensor, and the recorded wavefields are then electrically transmitted to the top of the tubing means for further analysis.

Once the data has been acquired, the data is then processed and analyzed with the novel method of using mode converted P- to S- wave data to permit the interpreter to delineate the surface of the anomalous geologic unit, such as a salt dome.

Figure 2:
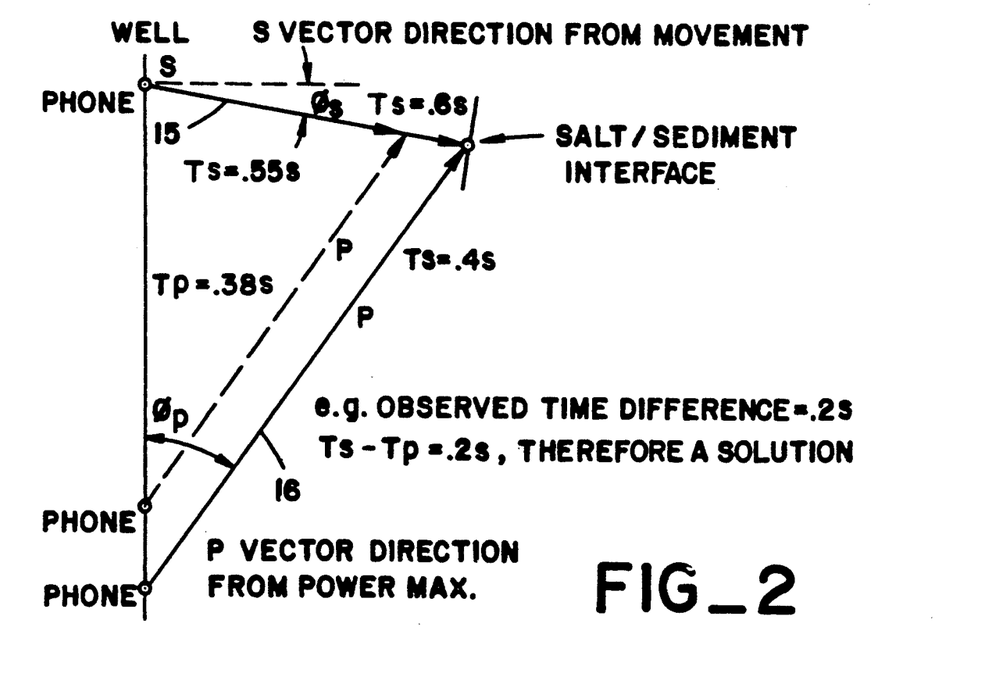
FIG. 2 is a schematic drawing that shows the inventive ray trace migration technique for the P-S converted wave.

To migrate the converted wave data using the inventive method, the incidence angle $\phi_p$ 18 of the direct arrival wave and incidence angle $\phi_s$ 19 of the converted S- wave are determined. $\phi_p$ can be easily determined by power maximizing the direct arrival, by one of ordinary skill in the art of seismic processing. Since power maximizing the converted wave event would be difficult in the presence of noise and other conflicting events, the incidence angle ($\phi_s$) can be estimated using the moveout between traces (or the difference in arrival time of the mode converted shear wave divided by the difference in depth between the sensors 17) (dt/dz) and the shear wave salt velocity (Vs), so that:

$$\phi_s = \sin^{-1}(dt/dz) * Vs$$

The next step is to geometrically determine the intersection point 21 of each converted S- wave raypath with the raypath of each direct arrival wave as shown in FIGS. 1 and 2. As the intersection points 21 are now known, the lengths of the individual raypaths 15 and 16 can be determined. Travel times along the converted S- wave raypath and the direct arrival raypath are then determined by dividing the length of each raypath by its respective velocity. Converted wave solutions are independent of sediment velocities, but are dependent on salt velocity. Whereas the S- wave velocity of sediment is somewhat uncertain, the S- wave velocity of salt can be easily measured by one skilled in the art, using a zero offset P- and S- wave VSP.

A point on the interface of the anomalous geologic unit with the surrounding earth can now be determined by comparing the difference between the travel times along both raypaths with the difference between the recorded arrival times of the converted S- wave and the direct arrival wave. At a given intersection point of the P- and S- wave raypaths, the length of each ray divided by its respective velocity gives the travel time along the ray. If the difference in these two travel times is equal to the recorded travel time difference between the direct and converted shear wave arrivals, then a solution for the salt-sediment interface is found.

The dip of the anomalous geologic unit, at the intersection between the P-P and P-S raypaths can now be determined by using Snell's Law, which is known to those of ordinary skill in the art of seismic processing.

A unique salt point is thus obtained when using only the direct arrival raypaths that are in the source-receiver plane. Note that the shear wave velocity of salt is close to the P- wave sediment velocity. Therefore, the P-S raypath will more likely be in the source-receiver plane than the P-P raypath. Therefore, if the direct arrival raypath is in the source-receiver plane, then the converted S- wave also travelled in the source-receiver plane. Therefore a unique salt-sediment point is obtained only if the P-P raypath is in the source-receiver plan.

The main advantage of the inventive method over a method of using only direct arrival migration is that the inventive method is independent of the velocities of the surrounding earth, generally sediment. It is also independent of the source location and the absolute time of the P- wave and S- wave arrivals.

EXAMPLES

Figure 3:
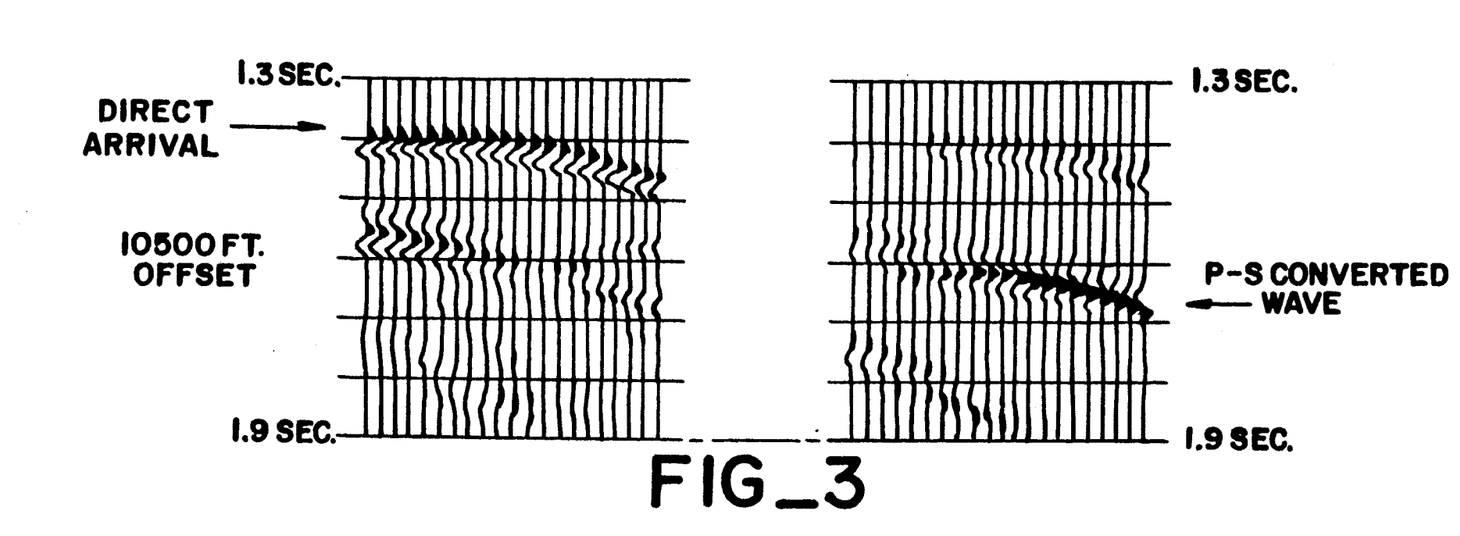
FIG. 3 shows two-component synthetic seismic data for two source offsets that shows a clear direct arrival (P-P) and a converted wave arrival (P-S).

FIG. 3 shows two-component synthetic seismic data for two source offsets that illustrates a clear, direct arrival (P-P) wave and a converted (P-S) wave arrival. Adequate data has therefore been recorded at both the horizontal (H) and vertical (V) geophones.

Figure 4:
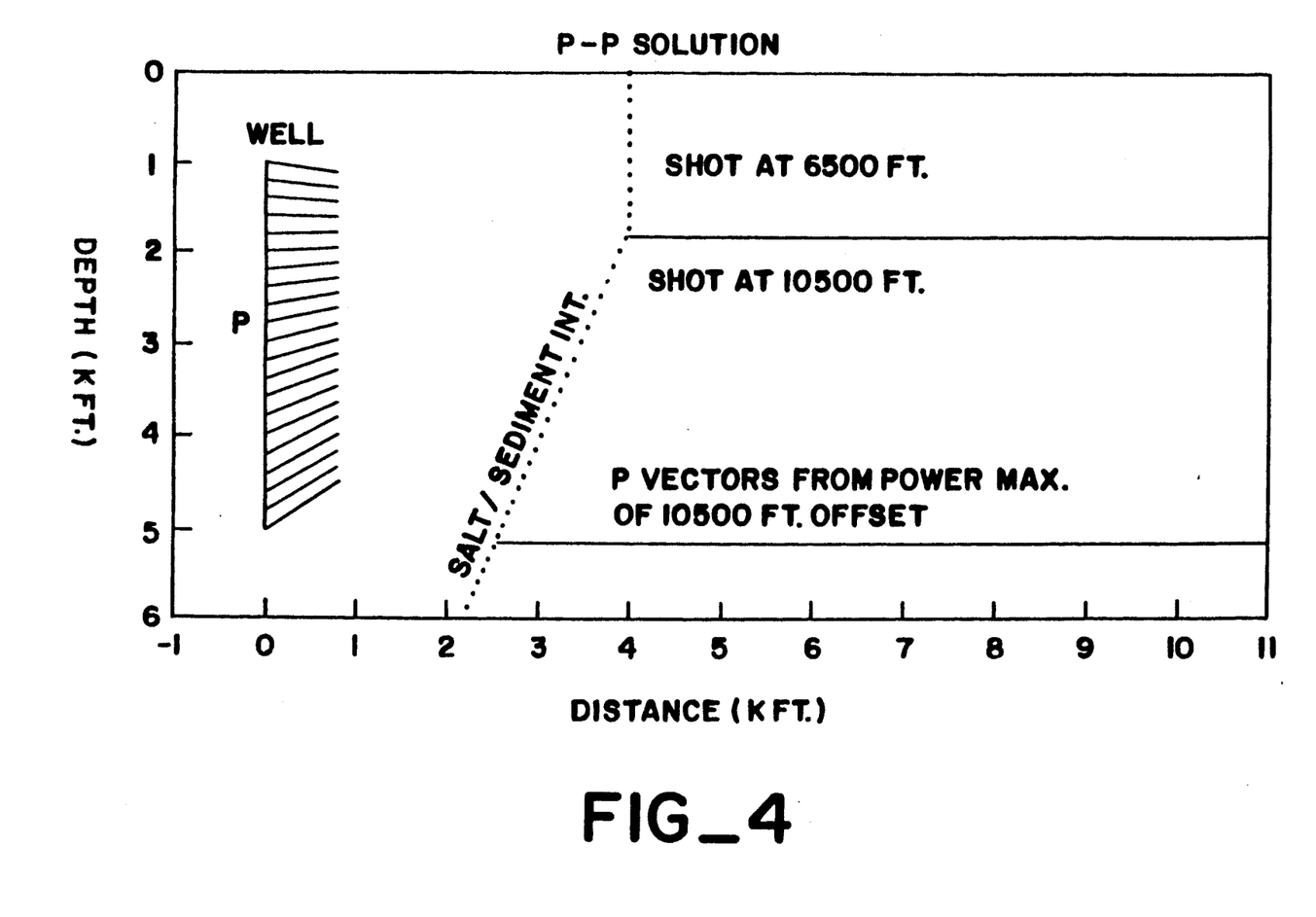
FIG. 4 is a schematic drawing that shows ray trace migrated dipbars using the P-P method for both shots.
Figure 5:
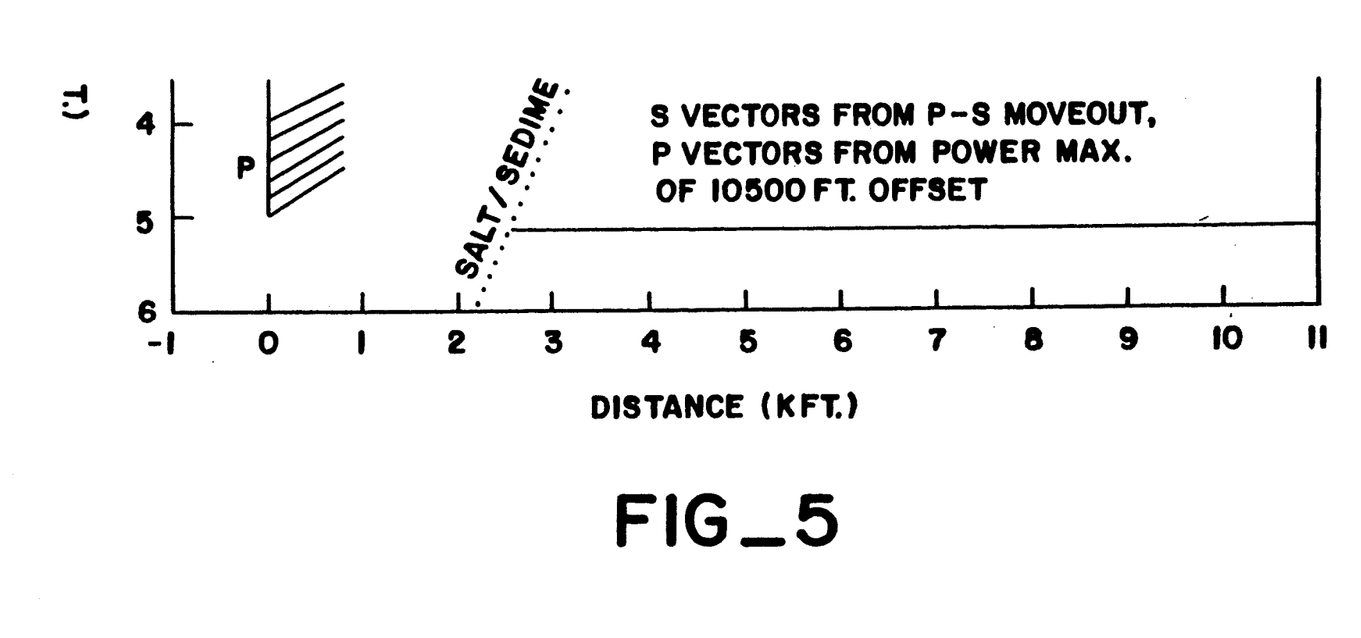
FIG. 5 is a schematic drawing that shows ray trace migrated dipbars using the P-S method for both shots.
Figure 6:
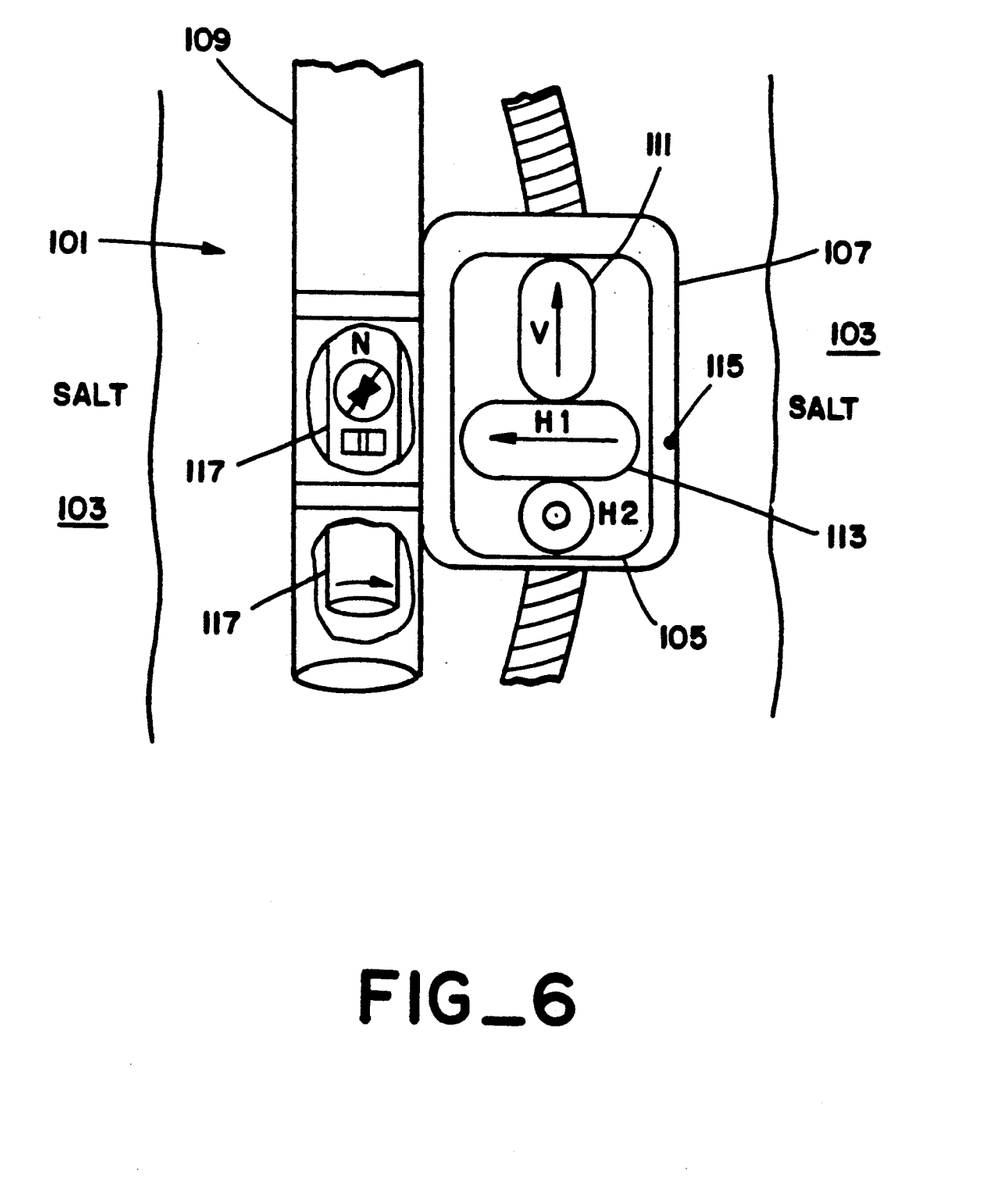
FIG. 6 is a schematic, sectional view that illustrates the method of determining the orientation of a sensing device.

FIG. 4 shows ray trace migrated dipbars using the direct arrival (P-P) method. FIG. 5 shows ray trace migrated dipbars using the converted S- wave (P-S) method. When migrated with the exact (known) model velocities, both the P-P and the P-S results are in close agreement, as shown. The P-S results show slightly more scatter than the P-P results, which is probably due to inconsistency in selecting the S- wave arrival times.

If the migration velocities for the surrounding earth (sediments) are increased or decreased by 5%, then the P-P dipbars become misplaced by as much as 800 feet. As there is generally some uncertainty in the sediment velocities, an interpreter would need known salt-sediment interface points to check the P-P migration results, however neither the P-P or converted S- wave method requires these known interface locations. Such locations would be helpful, however, as there is no certainty of identifying the P-S event.

Referring to FIG. 5, a method for determining the orientation of a sensing device, such as a 3C geophone, in a wellbore has been developed and is disclosed in a related application filed Oct. 4, 1991. Wellbore 101 has penetrated a salt dome 103. Three component geophone 105 has been hermetically sealed in a mold 107 and fixedly positioned to the outside of a tubing means 109, such as a string of drill pipe or production tubing. Polyurethane is a particularly useful substance from which to create the mold 107. The mold 107 surrounds the geophone and allows the geophone 105 to be rigidly attached to the tubing means 109. It is desireable that the vertical phone 111 be oriented parallel to the longitudinal direction of the tubing means 109 and one of the horizontal phones 113 be oriented perpendicular to the longitudinal direction of the tubing means 109.

An object 115 that naturally emits particles at a nearly constant rate in a field, such as a magnet, is fixedly attached close to and with known orientation with respect to the 3C geophone 105. Such a field is hereby defined as a radiation field. The radiation field is further defined to be omnidirectional, that is, resulting from being emitted in spherically concentric rings, and the emitting object 115 emits from a known position with respect to the geophone 105.

Tubing means 109 is then lowered into the borehole to a known depth. A tool 117 having a sensing mechanism that can observe the emitted radiation field is then lowered into the tubing means 109 to a depth such that the direction of the radiation field can be determined. The tool 117 then records the direction of the radiation field to thereby determine the orientation of the geophone. A magnetometer is particularly useful to observe the emitted radiation field if a magnet is used to emit such a field. The tool has a customized slit, which is caused to rotate, thereby observing the emitted field. Such tools that are able to be lowered through tubing are known in the well logging art. Orientation of the tool 117 and thus the slit, as well as the depth of the emitting device, can be determined by the use of gyroscopes, as is known in the well logging art. The inclination of the tubing means is also determined at the position of the emitting device.

It is a further object of the present invention to use seismic sensors of known orientation to delineate the surface of a geologic unit that has an anomalous velocity, such as a salt dome.

At least two seismic sensors are fixedly attached to the outside of a tubing means which has a top end and a bottom end. A three component geophone is a particularly useful seismic sensor. Each seismic sensor has three orthogonal axes of sensitivity, and each sensor is placed in a separate hermetically sealed housing such that the axes have known orientations with respect to the reference direction of the sealed housing. A polyurethane mold is particularly useful to hermetically seal the seismic sensors.

The sensors are then electrically connected to the top end of the tubing means so that electronic signals can be transmitted from each of the sensors to the top end of the tubing means.

The bottom end of the tubing means is then lowered into a wellbore which penetrates the geologic unit that has an anomalous velocity. A liquid is then pumped through the tubing means so that nearly all of the liquid is forced out of the bottom end of the tubing means and is forced up the borehole, in the annular space between the outside of the tubing means and the geologic formations The liquid is pumped to reach an elevation whereby all the housings are beneath the surface of the liquid. The liquid is comprised of a material that solidifies upon remaining motionless, such as cement. The type of cement and method for emplacing the cement are known in the well drilling art. A thixotropic mud may also be used as the liquid. This would allow a later retrieval of the sensors. Once the liquid solidifies, the sensor housings are now fixedly emplaced, and are in solid contact with the surrounding geologic formations.

The orientation of each of the orthogonal axes of the sensors is now calculated by observing the orientations of the reference direction of each of the sensor housings with respect to an Earth-based reference. The method for determining the orientation of a sensing device recited above is a particularly useful method to calculate the orientation of the orthogonal axes of the sensors.

It is preferred that the sensors are fixedly attached to the outside of the tubing means so that one axis is nearly parallel to the length of the tubing, and that one axis is perpendicular to the length of the tubing.

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. A method of using mode converted pressure, P- to S- shear wave data to delineate the surface of a geologic unit having an anomalous velocity, comprising the steps of:

(a) fixedly attaching at least two seismic sensors to the outside of a tubing means, said tubing means having a top end and a bottom end, each said sensor having three orthogonal axes of sensitivity;

(b) lowering said bottom end of said tubing means into a wellbore which penetrates said geologic unit and determining the depth of each of said sensors;

(c) calculating said orientations of each of said axes, with respect to an Earth based reference;

(d) causing at least one seismic wavefields to emanate from at least one seismic source points wherein said seismic wavefields are propagated through said geologic unit and the surrounding earth, so that a wavefield encounters said geologic unit at a non-normal incidence angle to generate a converted S- wave, and is observed at said orthogonal axes of sensitivity at said sensors;

(e) separately recording said observed wavefields along each of said orthogonal axes at each of said sensors;

(f) determining said incidence angle $\phi_p$ of said direct arrival wave;

(g) determining said incidence angle $\phi_s$ of said converted S- wave, where $$\phi_s = \sin^{-1}(dt/dz) \cdot V_s;$$

wherein dt is the difference in arrival time of the mode converted shear wave, and wherein dz is equal to the difference in depth between the sensors, and wherein Vs is equal to the shear wave salt velocity;

(h) determining the intersection point of each converted S- wave raypath with the raypath of each direct arrival;

(i) determining the length of said raypaths;

(j) determining the travel times along said converted S- wave raypaths and along said direct arrival raypaths by dividing said length of each raypath by the respective velocity of such raypath; and (k) determining a point on the interface of said geologic unit with said surrounding earth by comparing the difference between said raypath travel times with the difference between the recorded arrival times of said converted S- wave and said direct arrival wave.

2. The method as defined by claim 1, further comprising the step of determining the interface of said geologic unit with said surrounding earth at a point along said converted S- wave raypath in three dimensions if said direct arrival raypath is in the source-receiver plane.

3. The method as defined by claim 1, wherein said geologic unit is a salt dome.

* * * * *

UNITED STATES PATENT AND TRADEMARK OFFICE
CERTIFICATE OF CORRECTION

PATENT NO. : 5,200,928
DATED : April 6, 1993
INVENTOR(S) : Mark K. MacLeod

It is certified that error appears in the above-identified patent and that said Letters Patent is hereby corrected as shown below:

Cover page: Item (75):
(inventor's name)    "Mark K. MaCleod" should read
                     --Mark K. MacLeod--

Signed and Sealed this

Thirtieth Day of November, 1993

Attest:

BRUCE LEHMAN

Attesting Officer

Commissioner of Patents and Trademarks